United States Patent
Korlam et al.

(10) Patent No.: US 12,086,589 B2
(45) Date of Patent: Sep. 10, 2024

(54) CODE MIGRATION FRAMEWORK

(71) Applicant: Dell Products L.P., Round Rock, TX (US)

(72) Inventors: Tanvi Korlam, Bangalore (IN); Girish Murthy, Bengaluru (IN); Ashok Nitin, Patna (IN); Hariharan Suresh Babu, Chennai (IN); Navin Kumar Neithalath, Bangalore (IN); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 17/476,982

(22) Filed: Sep. 16, 2021

(65) Prior Publication Data

US 2023/0079904 A1    Mar. 16, 2023

(51) Int. Cl.
G06F 8/76 (2018.01)
G06F 8/51 (2018.01)
G06F 8/60 (2018.01)
G06N 5/02 (2023.01)
G06N 5/04 (2023.01)

(52) U.S. Cl.
CPC ................ G06F 8/76 (2013.01); G06F 8/51 (2013.01); G06F 8/60 (2013.01); G06N 5/027 (2013.01); G06N 5/04 (2013.01)

(58) Field of Classification Search
CPC .... G06F 8/76; G06F 8/51; G06F 8/60; G06N 5/027; G06N 5/04
See application file for complete search history.

(56) References Cited

U.S. PATENT DOCUMENTS

| | | | |
|---|---|---|---|
| 10,628,152 B2 * | 4/2020 | Chandramouli | G06F 8/65 |
| 10,884,713 B2 * | 1/2021 | Shaikh | G06F 18/214 |
| 11,354,120 B1 * | 6/2022 | Zhang | G06F 8/72 |
| 11,494,184 B1 * | 11/2022 | Dunham | G06F 9/45558 |
| 11,531,526 B1 * | 12/2022 | Dunham | G06N 3/08 |
| 2014/0215446 A1 * | 7/2014 | Araya | G06F 8/456 717/137 |
| 2018/0365008 A1 * | 12/2018 | Chandramouli | G06F 8/76 |
| 2020/0264919 A1 * | 8/2020 | Vukovic | G06N 20/00 |
| 2020/0272432 A1 * | 8/2020 | Shaikh | G06N 3/08 |
| 2020/0326935 A1 * | 10/2020 | Hicks | G06F 8/76 |

(Continued)

*Primary Examiner* — Matthew J Brophy
(74) *Attorney, Agent, or Firm* — DALY, CROWLEY, MOFFORD & DURKEE, LLP (57) ABSTRACT

In one aspect, an example methodology implementing the disclosed techniques includes, by a computing device, determining a source platform code for migration from a source platform to a target platform and determining one or more attributes of the source platform code. The method also includes determining, using a machine learning (ML) model, one or more existing templates based on the one or more attributes of the source platform code, and recommending the one or more existing templates for use in generating a template for migration of the source platform code to the target platform. The template for the source platform code is configured to convert the source platform code to a target platform code suitable for the target platform. The one or more existing template can then be used to generate a template for migrating the source platform code to a target platform code suitable for the target platform.

19 Claims, 6 Drawing Sheets

(56) References Cited

U.S. PATENT DOCUMENTS

| | | | |
|---|---|---|---|
| 2020/0387357 A1* | 12/2020 | Mathon | G06F 9/4411 |
| 2021/0182174 A1* | 6/2021 | Velammal | G06F 11/3466 |
| 2022/0261231 A1* | 8/2022 | Lewis | G06N 3/04 |
| 2022/0365778 A1* | 11/2022 | Jia | G06F 8/76 |

\* cited by examiner

CODE MIGRATION FRAMEWORK

BACKGROUND

Cloud computing architectures enable ubiquitous, convenient, on-demand network access to a shared pool of computing services. Cloud services, such as Software-as-a-Service (SaaS) applications, provide numerous benefits including on-demand provisioning, productivity, performance, availability, security, and cost savings. Due to their many benefits, organizations are increasingly migrating away from their on-prem, monolithic enterprise applications to SaaS applications offered in cloud environments.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Organizations are increasingly migrating away from their on-prem, monolithic enterprise applications to cloud-based applications such as SaaS applications in cloud environments due to their may efficiencies and benefits. However, migrating to cloud-based applications bring in the challenges related to any application migration. For example, an organization's on-prem application typically includes numerous customizations. These customizations refer to code that provides additional functionality, such as, by way of example, user authentication/authorization, logging constraints, error handling, and other enhancements, among others, in addition to the on-premise application's "core" functionality. The customizations allow the on-prem application to function in accordance with the organization's preferences and/or requirements. When migrating from an on-prem application to a cloud-based application (e.g., an SaaS application), an organization needs to also migrate the customizations from the on-prem platform to the cloud platform. In addition, applications are likely to be integrated with the other applications within an organization to automate various business processes of the organization. Thus, the integration code will also need to be migrated to align with the cloud-based application. Along with the extensive knowledge of the differences between the on-prem platform and the cloud platform, a considerable amount of time and effort is required to migrate from an on-prem application to a cloud-based application. Embodiments of the present disclosure provide solutions to these and other technical problems described herein.

In accordance with one illustrative embodiment provided to illustrate the broader concepts, systems, and techniques described herein, a computer implemented method to recommend an existing template for use in generating a template for code migration includes determining a source platform code for migration from a source platform to a target platform and determining one or more attributes of the source platform code. The method also includes determining, using a machine learning (ML) model, one or more existing templates based on the one or more attributes of the source platform code. The method further includes recommending the one or more existing templates for use in generating a template for migration of the source platform code to the target platform. The template for the source platform code is configured to convert the source platform code to a target platform code suitable for the target platform.

In some embodiments, the method also includes generating a template for the source platform code. In one aspect, generating the template for the source platform code is based on one of the one or more existing templates.

In some embodiments, the one or more existing templates are determined based on cosine similarity.

In some embodiments, the one or more existing templates are determined based on Euclidean distance.

In some embodiments, the one or more existing templates are determined based on Manhattan distance.

In some embodiments, the method also includes generating a template for the source platform code, migrating, using the template for the source platform code, the source platform code to the target platform code, and validating the target platform code for compliance with predetermined criteria.

In some embodiments, the method also includes generating a template for the source platform code, migrating, using the template for the source platform code, the source platform code to the target platform code, validating the target platform code for compliance with predetermined criteria, and, responsive to validating the target platform code, generating a deployment manifest configured to deploy the target platform code in the target platform.

In some embodiments, the source platform is an on-premises computing platform and the target platform is a cloud computing platform.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to determine a source platform code for migration from a source platform to a target platform and determine one or more attributes of the source platform code. Execution of the instructions also causes the one or more processors to determine, using a machine learning (ML) model, one or more existing templates based on the one or more attributes of the source platform code. Execution of the instructions further causes the one or more processors to recommend the one or more existing templates for use in generating a template for migration of the source platform code to the target platform, wherein the template for the source platform code is configured to convert the source platform code to a target platform code suitable for the target platform.

In some embodiments, execution of the instructions further causes the one or more processors to generate a template for the source platform code based on one of the one or more existing templates.

In some embodiments, the one or more existing templates are determined based on one of cosine similarity, Euclidean distance, or Manhattan distance.

In some embodiments, execution of the instructions further causes the one or more processors to generate a template for the source platform code, migrate, using the template for the source platform code, the source platform code to the target platform code, and validate the target platform code for compliance with predetermined criteria.

In some embodiments, execution of the instructions further causes the one or more processors to generate a template for the source platform code, migrate, using the template for the source platform code, the source platform code to the target platform code, validate the target platform code for compliance with predetermined criteria, and, responsive to validation of the target platform code, generate a deployment manifest configured to deploy the target platform code in the target platform.

In some embodiments, the source platform is an on-premises computing platform.

In some embodiments, the target platform is a cloud computing platform.

According to another illustrative embodiment provided to illustrate the broader concepts described herein, a non-transitory, computer-readable storage medium has encoded thereon instructions that, when executed by one or more processors, causes a process to be carried out. The process includes determining a source platform code for migration from a source platform to a target platform and determining one or more attributes of the source platform code. The process also includes determining, using a machine learning (ML) model, one or more existing templates based on the one or more attributes of the source platform code. The process further includes recommending the one or more existing templates for use in generating a template for migration of the source platform code to the target platform, wherein the template for the source platform code is configured to convert the source platform code to a target platform code suitable for the target platform.

In some embodiments, the process further includes generating a template for the source platform code based on one of the one or more existing templates.

In some embodiments, the process also includes generating a template for the source platform code, migrating, using the template for the source platform code, the source platform code to the target platform code, and validating the target platform code for compliance with predetermined criteria.

In some embodiments, the process also includes generating a template for the source platform code, migrating, using the template for the source platform code, the source platform code to the target platform code, validating the target platform code for compliance with predetermined criteria, and, responsive to validating the target platform code, generating a deployment manifest configured to deploy the target platform code in the target platform.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Although certain embodiments and/or examples are described herein in the context of cloud migration, it will be appreciated in light of this disclosure that such embodiments and/or examples are not restricted as such, but are applicable to migration of code from a source platform to a target platform in the general sense. Moreover, examples of specific migrations, such as from an on-prem email platform or on-prem email application to a cloud email platform or cloud-based email application, are provided herein for illustrative purposes only and are not intended to be limiting. For example, the concepts, techniques, and structures described herein may be applied to migration of applications or platforms to a non-cloud platform or a cloud platform, in the general sense. Further, the acts components, elements, and features discussed in conjunction with any one or more examples are not intended to be excluded from a similar role in any other examples.

Figure 1:
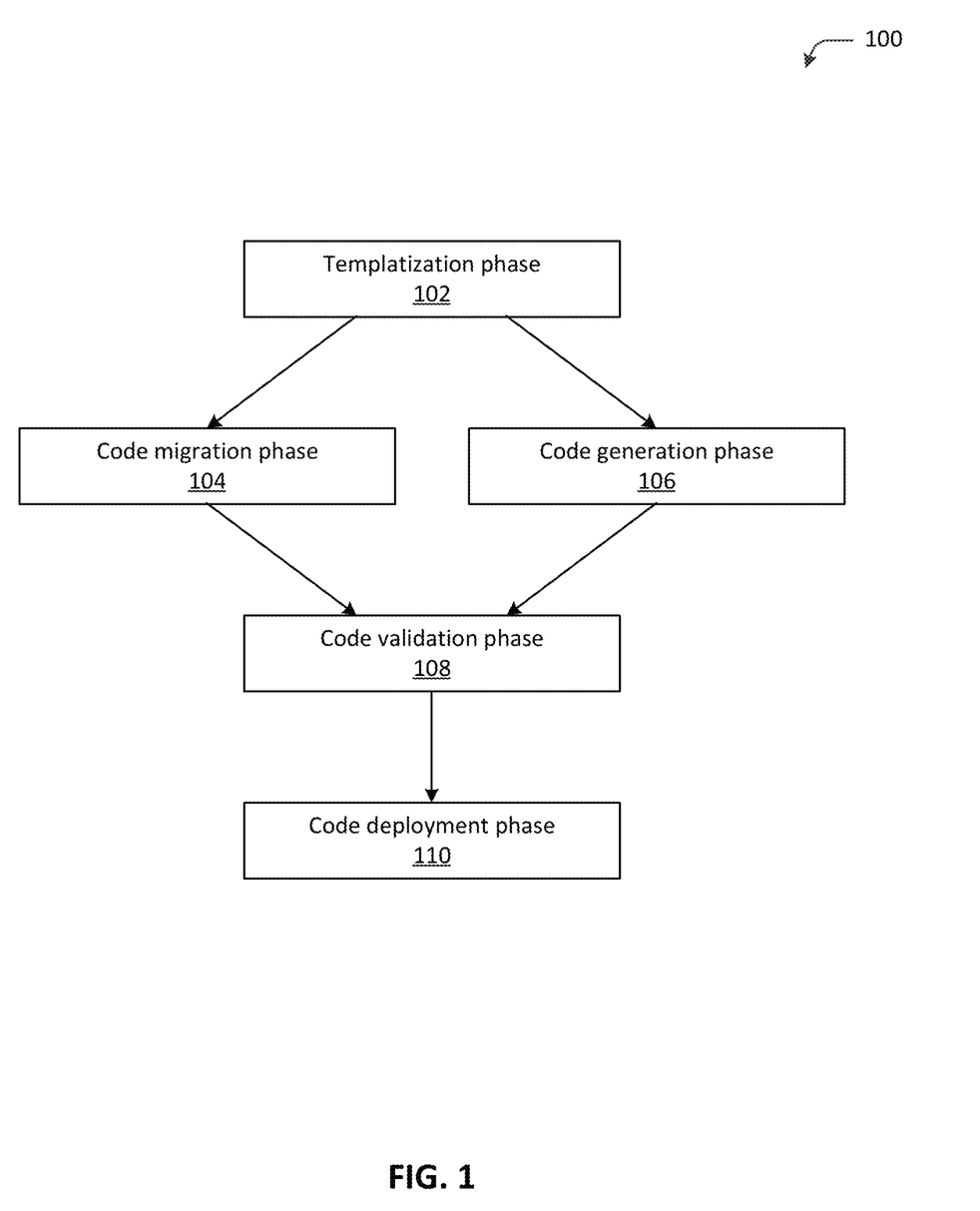
FIG. 1 shows an illustrative workflow for a code migration framework, in accordance with an embodiment of the present disclosure.

Referring now to FIG. 1, shown is an illustrative workflow for a code migration framework 100, in accordance with an embodiment of the present disclosure. In brief, framework 100 facilitates the programmatic and systematic migration of code (e.g., customizations) from an on-prem platform application to a cloud platform application (i.e., cloud-based application). The migration can be achieved using templates that convert the code from the source platform (i.e., source platform code) to code that is suitable for the target platform (i.e., target platform code). In some embodiments, framework 100 allows for use of the templates to generate new code (e.g., macro-services) that is based on the cloud-based application's application programming interfaces (APIs). In any case, the code generated using framework 100 aligns with the cloud native development best practices and is ready for deployment in the cloud platform. Framework 100 can be implemented and/or performed by or on behalf of an organization, such as a business entity, company, corporation, governmental agency, educational institution, or the like, that engages in migration of code from one platform (e.g., legacy platform) to another different platform.

As depicted, framework 100 includes a templatization phase 102, a code migration phase 104, a code generation phase 106, a code validation phase 108, and a code deployment phase 110. Templatization phase 102 includes generation and management of templates for use in framework 100. In some embodiments, the templates map an API from an on-prem application to an API provided by a cloud-based application. For example, an organization may be migrating from an on-prem email application to a cloud-based email application. In this example, the customizations (e.g., the code that implements the customizations) may have been developed using a software development kit (SDK) provided for building applications for the specific on-prem email application. However, the cloud-based email application may support an API that is different than the API supported by the SDK of the on-prem email application. Thus, in order to facilitate the migration of the customizations to properly operate with the cloud-based email application, templates may be generated which map the on-prem email application SDK API to the cloud-based email application API.

In some embodiments, an individual template may be generated for each specific use case or enhancement (e.g., each customization) of the on-prem email application such as user authentication/authorization, logging constraints, and error handling, among others, to provide a few examples. In some embodiments, templatization phase 102 includes generation and management of templates which may be used to generate new code that is based on the cloud-based email application API. For example, the generated new code may add functionality to the cloud-based email application in addition to the customizations that are migrated to the cloud-based email application. According to one embodiment, the templates may be generated by a user, such as a system administrator, who is knowledgeable with both the on-prem email application API and the cloud-based email application API. The generation and management of such templates will be further described below at least with respect to FIGS. 2-5.

Code migration phase 104 includes the migration of code from a source platform to a target platform using one or more of the templates generated during templatization phase 102. In the above example migration from the on-prem email application to a cloud-based email application, code migration phase 104 can include migrating the individual customizations from the on-prem email application SDK calls to align with the cloud-based email application API calls. For example, a template that is appropriate for a specific customization, which may represent a specific use case or enhancement of the on-prem email application, may be applied to the customization to convert the SDK API calls in the customization to the cloud-based email application API calls. Here, the conversion of the API calls in the customization can be based on the API mappings in the template. When migrated using the template, the converted code (i.e., migrated code) includes the API calls which are supported by the cloud-based email application.

Code generation phase 106, which may be optional in some embodiments, includes the generation of code (e.g., new customizations) for a target platform using one or more of the templates generated templatization phase 102. The generated code may be an implementation of a customization (e.g., use case) of the target platform application. In the above example migration from the on-prem email application to a cloud-based email application, the cloud-based email application may include certain features or functionality that are not included in the on-prem email application. Additionally or alternatively, a customization that a user desires in the cloud-based email application may not be included in the on-prem email application. In any case, one or more templates may have been generated, for example, in templatization phase 102, for use in creating new customizations (e.g., new customizations or use cases in addition to the customizations migrated to the target platform) that are based on the cloud-based email application API. In some embodiments, the templates for use in generating new code may add additional code which may be needed to wrap the API to make the generated code (e.g., code that implements the customization) production grade. For example, the additional code may create stubs to expose the functionality as APIs, add logging and monitoring capabilities, add capabilities for error handling, fault tolerance, etc., and add security related capabilities (e.g., authentication and error handling), among others.

Code validation phase 108 includes the process of checking that the code generated in the code migration phase 104 (e.g., the code that represents the migrated customizations) and the code generation phase 106 (e.g., code that implements the new customizations) is in compliance with specified standards and recommendations. In some embodiments, an existing continuous integration/continuous delivery (CI/CD) tool or solution, such as GitLab or Jenkins, may be used in code validation phase 108 to assist with the validation of the code. The CI/CD tool may provide a pipeline template that can be used to specify the version control (VC) best practices, code quality analysis, security requirements, performance criteria, etc., for validating the code. The desired VC best practices, code quality analysis, security requirements, performance criteria, etc. may depend on the individual organization and the policies implemented by the organization. For example, in the above example migration from the on-prem email application to a cloud-based email application, an existing CI/CD tool can be used to validate the code for alignment to microservices.

Code deployment phase 110, which may be optional, includes the generation of a deployment manifest for use in deploying the validated code from the code validation phase 108 in the target platform. Deployment manifest are specific to the target platform in which the code (e.g., an application) is being deployed. A deployment manifest is an artifact which provides the information needed to successfully deploy the code (e.g., an application) in a target platform. Such information may include the environmental variables (e.g., variables whose values are set outside the application, typically through functionality built into the operating system or deployment artifacts), operating parameters (e.g., heap memory, number of threads, etc.), external dependencies (e.g., additional dependent third-party functionalities that are needed for the application to run), and other parameters that are needed to successfully deploy the code in the target platform. A deployment manifest is specific to the target platform. For instance, a Pivotal Cloud Foundry (PCF) manifest file will have a format that is different than a Kubernetes deployment file, and can be of a different format such as Yet Another Markup Language (YAML) or Extensible Markup Language (XML). In some embodiments, the deployment manifests can be templatized and auto-populated based on the code that is to be deployed. For example, individual templates for the different deployment manifests, if needed, can be generated by a user when generating the templates for code migration and/or new code generation in templatization phase 102. To generate a deployment manifest from a template, the deployment documents for the legacy code (e.g., the code in the source platform) can be processed (e.g., read) to extract the instructions, environment variables, dependencies, etc., which were defined for the proper running of the code in the source platform. The information extracted from the legacy deployment documents can then be input to an appropriate template to generate a deployment manifest for use in deploying the code in a specific target platform.

Figure 2:
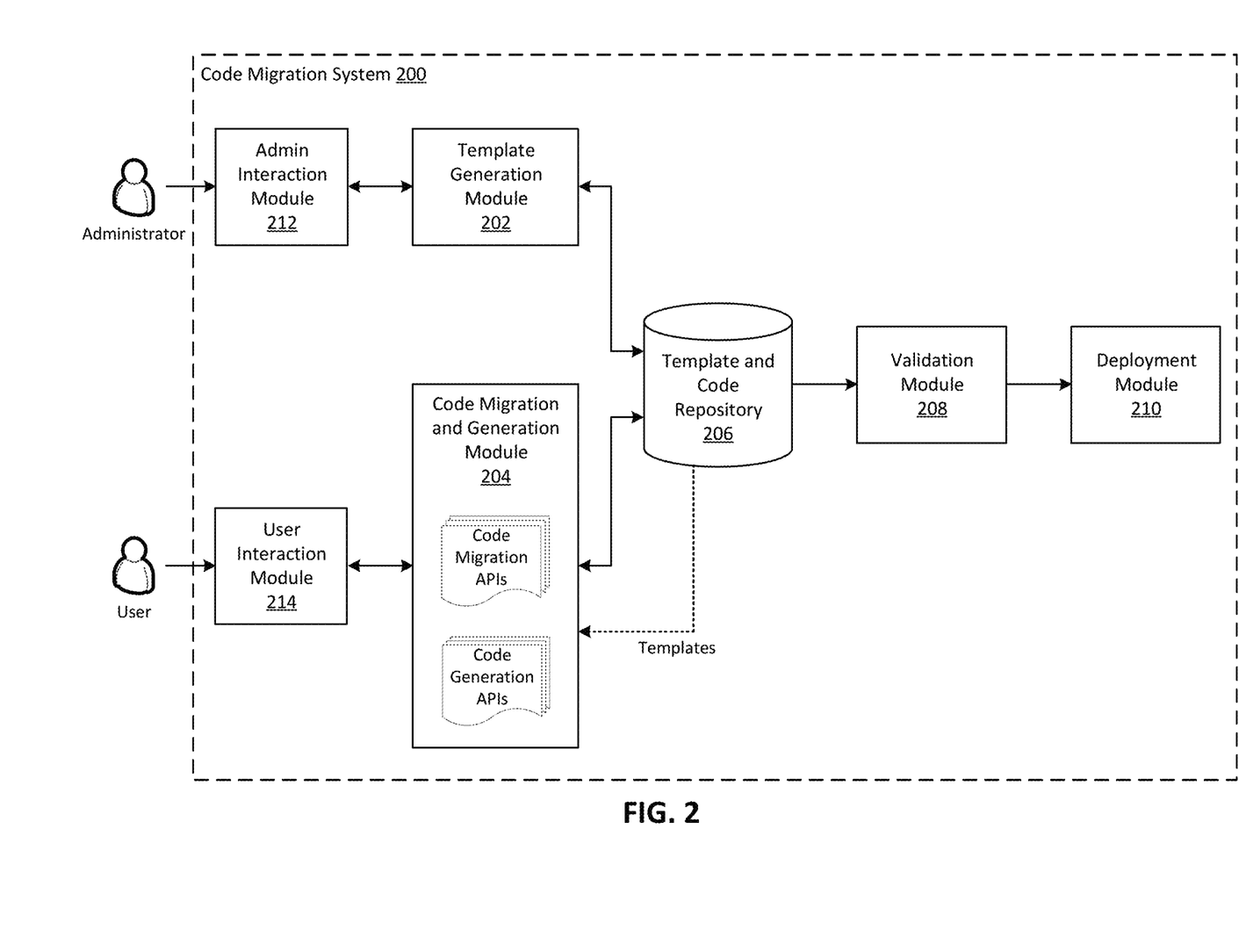
FIG. 2 is a block diagram illustrating selective components of an example code migration system in which various aspects of the code migration framework may be implemented, in accordance with an embodiment of the present disclosure.

FIG. 2 is a block diagram illustrating selective components of an example code migration system 200 in which various aspects of code migration framework 100 may be implemented, in accordance with an embodiment of the present disclosure. As discussed above, an organization, for instance, may implement framework 100 to provide programmatic and systematic migration of code to a target platform. As shown, code migration system 200 includes a template generation module 202, a code migration and generation module 204, a template and code repository 206, a validation module 208, a deployment module 210, an admin interaction module 212, and a user interaction module 214. Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. For instance, template and code repository 206 may be external to code migration system 200. It is also appreciated that code migration system 200 may not include certain of the components depicted in FIG. 2. For example, in certain embodiments, code migration system 200 may not include validation module 208 and/or deployment module 210. Thus, it should be appreciated that numerous configurations of code migration system 200 can be implemented and the present disclosure is not intended to be limited to any particular one. Code migration system 200 can be any stand-alone computing platform, such as a server computer, desktop or workstation computer, laptop computer, or other suitable computing platform (e.g., a computing device 600 of FIG. 6) capable of implementing framework 100.

Template generation module 202 is configured to predict the existing templates that most closely match a source platform code (e.g., code implementing a customization in the source platform) when provided details, such as the properties and/or attributes, regarding the source platform code. Examples of properties and/or attributes include, but are not limited to, the SDK endpoint to invoke, number of retries in terms of failure, SDK endpoint to invoke in case of handling any error condition, and location to log event and messages, to name a few examples. Template generation module 202 is also configured to recommend the existing templates that most closely match a source platform code for use in generating a template for migrating the source platform code. In other words, template generation module 202 can determine which existing template(s) most closely match the source platform code and recommend one or more of the closely matching templates to a user as a guide or reference in generating a new template. The source platform code is code that is to be migrated to a target platform. Template generation module 202 can then recommend the matching existing template(s) for use in generating a template for use in migrating the source platform code to the target platform. To this end, in some embodiments, template generation module 202 can leverage a learning model (e.g., a machine learning (ML) model) and content-based recommendation algorithm(s) to determine the one or more existing templates that most closely match a source platform code.

In some such embodiments, template generation module 202 can use the ML model and the content-based recommendation algorithm(s) to browse or otherwise scan through the provided source platform code (i.e., the codebase) to identify sections of the code that will be need to be updated (e.g., the SDK API calls) and hence templatized and may be provided with additional code for capabilities or actions, such as error handling, logging, etc., as needed, to enable the code to properly operate. The API mappings (e.g., mappings of the on-prem email application SDK API to the cloud-based email application API) contained in the existing templates can then be searched to identify mappings that may be used in templatizing the sections of the code that need to be updated as well as any additional code that is provided.

It is appreciated that content-based recommendation is a ML technique that uses similarities in features to make recommendation decisions. Thus, template generation module 202 can utilize a content-based recommendation algorithm to recommend one or more existing templates based on domain-specific notion of the item content (i.e., existing template metadata). This can be accomplished, for example, by determining or creating metadata regarding the templates as the templates (i.e., existing templates) are generated. Example of the metadata include the mapping of the API endpoint to a SDK endpoint to replace, the intent of a SDK's endpoint, the current version of the SDK and the compatible version of the API, to name a few examples. The determined or created metadata regarding an existing template can then be associated with the existing template. At the time of source platform code (e.g., application) migration, based on the properties and/or attributes of the source platform code, template generation module 202 can match the existing templates by comparing the properties and/or attributes of the source platform code to the metadata associated with the individual existing templates and determine whether to recommend an existing template.

In some embodiments, comparison of the properties and/or attributes of the source platform code to the metadata associated with the individual existing templates can be implemented by leveraging natural language processing (NLP) and a distance algorithm. For example, NLP can be utilized to analyze the properties and/or attributes associated with the source platform code (e.g., application) and convert the properties and/or attributes to a word vector for use in performing the comparison. This word vector can be input to a similarity/distance algorithm that compares the input vector to individual vectors representing the metadata associated with an existing template. An existing template whose vector is the most similar (i.e., less distance) to the input vector (i.e., the word vector representing the source platform code) can be determined to be the matching existing template and recommended by template generation module 202. In one embodiment, template generation module 202 can recommend more than one matching existing template. For example, template generation module 202 can identify two, three, or any desired number of existing templates whose vectors are the most similar to the input vector and recommend these existing templates for use in generating a template for use in migrating the source platform code.

In some embodiments, a Term Frequency Inverse Document Frequency (TF-IDF) vectorizer can be used to convert the properties and/or attributes associated with the source platform code (e.g., application) to a word vector. The TF-IDF vectorizer transforms text into a meaningful representation of numbers which can be used to fit a ML algorithm for prediction. The text of the properties and/or attributes associated with a source platform code can be passed or otherwise input to the TF-IDF vectorizer, which then calculates a tf-idf score for each word in the text word by word. In one embodiment, textual pre-preprocessing, such as removal of stop words, stemming, and lemmatization, among others, can be performed on the text of the properties and/or attributes prior to passing or inputting to the TF-IDF vectorizer. The tf-idf score output by the TF-IDF vectorizer is a matrix of numbers (e.g., a vector) that represents the properties and/or attributes of the source platform code, and can be used to match with the vectors representing the metadata associated with the existing templates (vectors of the existing template metadata). In a similar manner, the TF-IDF vectorizer can also be used to generate a vector representing the metadata associated with the individual existing templates.

Figure 3:
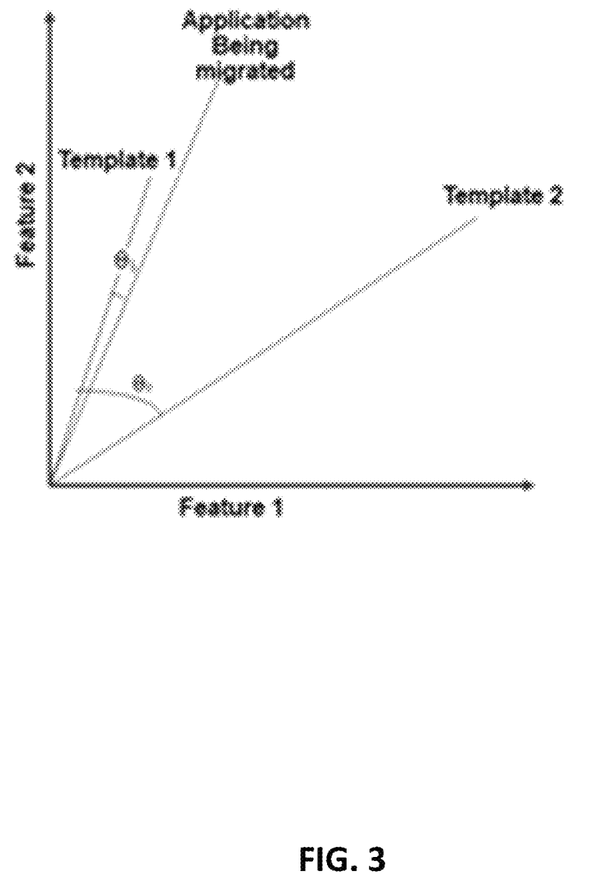
FIG. 3 is a diagram illustrating a match of an application to be migrated to an existing template based on cosine similarity.

In some embodiments, cosine similarity can be used as the distance algorithm to determine a match or matches. In other embodiments, other measures of similarity, such as Euclidean distance or Manhattan distance, can be used as the distance algorithm. Cosine similarity is a measure of similarity between two non-zero vectors (in this case a vector representing the properties and/or attributes of the source platform code and a vector representing the metadata associated with an existing template) of an inner product space that measures the cosine of the angle between the two non-zero vectors. As such, cosine similarity is a judgment of orientation, and not magnitude. In this vector space model, each existing template can be stored as a vector of its metadata in a multi-dimensional space and the angle between two vectors (e.g., vector representing an application and a vector representing an existing template) can be calculated to determine the similarity of the vectors. The method of determining a matching existing template is by calculating the cosine of the angle between a vector representing the properties and/or attributes of an application and a vector representing the metadata associated with an existing template. Two vectors with the same orientation will have 0 degrees between them and a cosine similarity of 1 ($\cos(0)=1$). Two vectors that are completely different from each other (diametrically opposite) will have a magnitude of 180 degrees between them and a cosine similarity of −1 ($\cos(180)=-1$). Two vectors that have a magnitude of 90 degrees will have cosine similarity of 1 ($\cos(90)=1$). The value of cosine will increase as the angle between two vectors decreases, which signifies more similarity. The most closely matching (i.e., most similar) existing template is the one whose vector has the smallest angle (and largest cosine similarity). An illustrative matching of an application (source platform code) to be migrated to an existing template based on cosine similarity is shown in FIG. 3. As can be seen, based on cosine similarity, "Template 1" is a closer match to the application than "Template 2".

Referring again to FIG. 2, admin interaction module 212 is configured to provide a user interface that is capable of displaying information to, and receiving information from, a user of code migration system 200. For example, in one implementation, admin interaction module 212 provides a template generation interface, such as a portal and/or a user interface (e.g., a graphical user interface (GUI) and/or a command line interface (CLI)), that is capable of receiving input that generates a new template or manipulates an existing template. The generated templates may be configured to convert code from a source platform to code that is suitable for a target platform. Additionally, generated templates may be configured to generate deployment manifests for deploying code in various target platforms. The template generation interface is also capable of displaying existing templates (e.g., existing templates being recommended to a user). Admin interaction module 212 is further configured provide an application input interface that receives input specifying code (e.g., source platform code) which is to be analyzed for migration, and optionally, details (e.g., properties and/or attributes) regarding the code. Still other interfaces can be implemented in other embodiments, including interfaces configured to display information to, and receive information from, a user, such as a system administrator, to enable the user to login (e.g., authenticate) and interact with code migration system 200, and in particular, template generation module 202.

The various interfaces generated by admin interaction module 212 can be rendered using hardware components associated with an end user's computing device. For example, a user tasked with generating templates to facilitate code migration, such as a system administrator, can use input/output components (e.g. a display, a keyboard, a pointing device, and a touch sensitive surface) associated with his/her computing device to leverage services provided by admin interaction module 212 to generate and manage templates which can be used to enable code migration and new code generation.

Code migration and generation module 204 is configured to receive code and, using one or more templates, migrate the received code to code that is suitable for a target platform. For example, code migration and generation module 204 can receive source platform code, identify a template that was generated for migrating the source platform code, and apply the identified template to the source platform code to convert the source platform code to code that is suitable for a target platform. Code migration and generation module 204 is also configured to receive a description of a specific task (e.g., customization) for a target platform, and in particular, of a target platform application, and, using one or more templates, generate new code that is an implementation of the specific task. The template(s) for generating the new code can be identified based on the description of the specific task and the metadata associated with the templates. In such embodiments, code migration and generation module 204 may implement and expose an application program interface (API) which can be used to connect to and access (i.e., invoke) the features and services of code migration and generation module 204. For example, an application such as user interaction module 214 or another application can use the exposed API to access the features and services of code migration and generation module 204. In one embodiment, the code generated by code migration and generation module 204 (e.g., the code generated by converting source platform code and/or the new code) may be code that is aligned to the cloud-native principles (e.g., optimized to the unique capabilities of the cloud). For example, code generated by code migration and generation module 204 may be generated as a microservice.

User interaction module 214 is configured to provide a user interface that is capable of displaying information to, and receiving information from, a user of code migration system 200. For example, in one implementation, user interaction module 214 provides a code migration interface, such as a portal and/or a user interface (e.g., a graphical user interface (GUI), a command line interface (CLI), and/or a chatbot), that is capable of receiving input that specifies code that is to be migrated. In response to receiving such input, the code migration interface can send or otherwise provide the code to code migration and generation module 204 for migration. User interaction module 214 is further configured provide a new code generation interface that receives input describing a specific task (e.g., customization) for a target platform application. In response to receiving such input, the new code generation interface can send or otherwise provide the description of the specific task to code migration and generation module 204 for generation of code that implements the specific task. Still other interfaces can be implemented in other embodiments, including interfaces configured to display information to, and receive information from, a user to enable the user to login (e.g., authenticate) and interact with code migration system 200, and in particular, code migration and generation module 204.

The various interfaces generated by user interaction module 214 can be rendered using hardware components associated with an end user's computing device. For example, a user tasked with migrating code (e.g., customizations to an on-prem application) can use input/output components (e.g. a display, a keyboard, a pointing device, and a touch sensitive surface) associated with his/her computing device to leverage services provided by user interaction module 214 to migrate code to a target platform and/or generate new code for the target platform.

Template and code repository 206 can store or otherwise record the templates that have been generated and the metadata associated with the templates. These templates can then be used by template generation module 202 and code migration and generation module 204 in performing their respective tasks, as described herein. Template and code repository 206 can also store or otherwise record the legacy code (e.g., source platform code) once the code has been migrated. Template and code repository 206 can also store or otherwise record the code (e.g., code generated for deployment on a target platform) that is generated by code migration and generation module 204. Template and code repository 206 may be implemented using any computer-readable storage media suitable for carrying or having data or data structures stored thereon.

Validation module 208 is configured to validate code for compliance with specified standards and recommendations, such as, for example, VC best practices. The standards and recommendations may be specified by the organization implementing the framework 100 based on their implemented policies. For example, in some embodiments, validation module 208 can be implemented using or can include an existing third-party CI/CD tool such as GitLab or Jenkins. Such tools may provide a pipeline template that can be used to specify the version control (VC) best practices, code quality analysis, security requirements, performance criteria, etc., for which the code is to be validated for compliance. For example, code migration and generation module 204 can send newly generated code (e.g., the code generated by converting source platform code and/or the new code) to validation module 208 for validation.

Deployment module 210 is configured to generate deployment manifests for use in deploying code in various target platforms. A deployment manifest may be specific to the different target platforms in which the code is being deployed. The deployment manifests may be generated using predefined templates. For example, to generate a deployment manifest for code that is to be deployed in a target platform, the deployment documents for the legacy code (e.g., the corresponding code in the source platform) can be processed (e.g., read) to extract the instructions, environment variables, dependencies, etc., which were defined for the proper running of the code in the source platform. Deployment module 210 can then input the information extracted from the legacy deployment documents to an appropriate template to generate a deployment manifest for use in deploying the code in the target platform.

Figure 4:
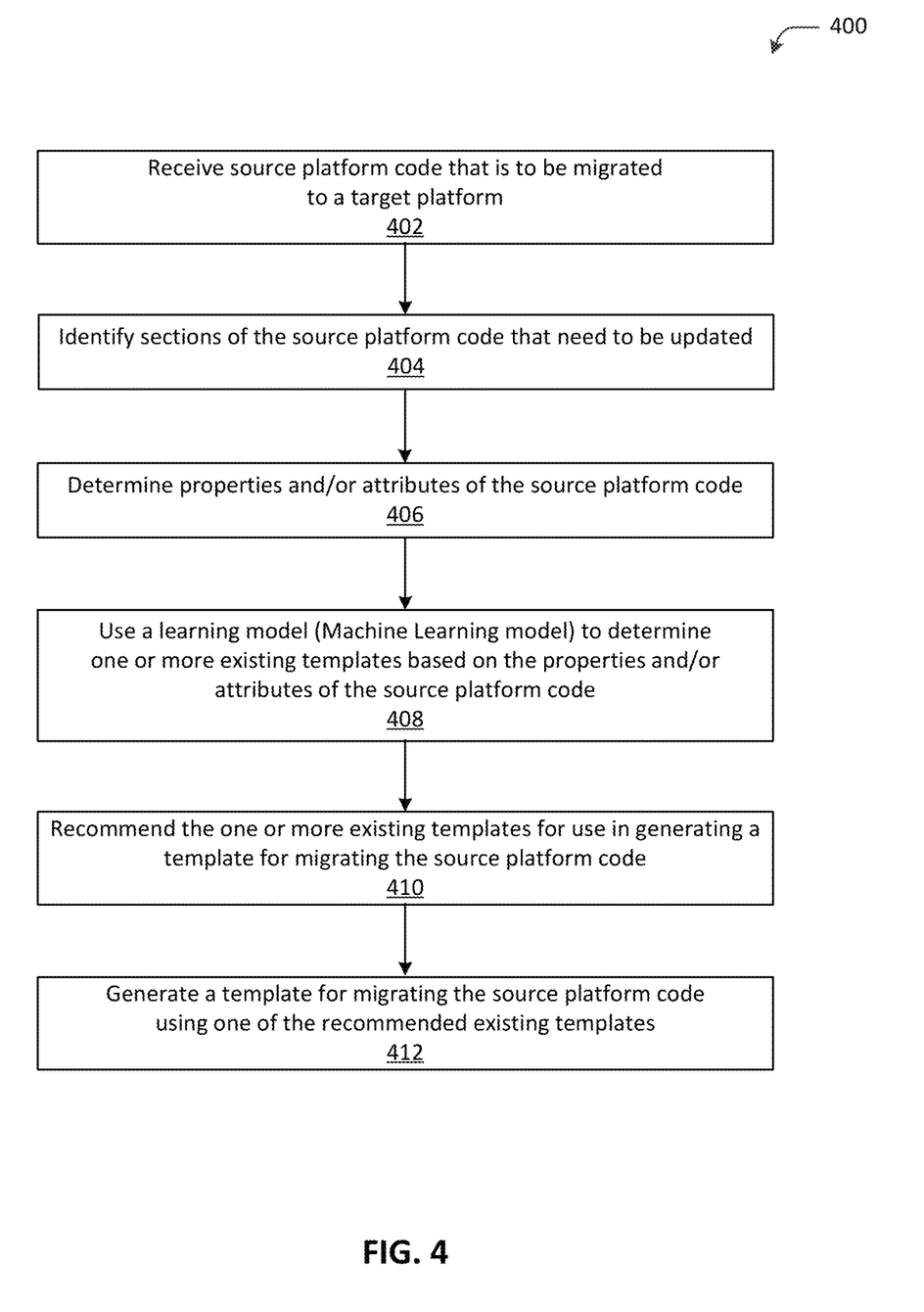
FIG. 4 is a flow diagram of an illustrative process for recommending an existing template for use in generating a template for code migration, in accordance with an embodiment of the present disclosure.

FIG. 4 is a flow diagram of an illustrative process 400 for recommending an existing template for use in generating a template for code migration, in accordance with an embodiment of the present disclosure. Example process 400, and example process 500 further described below, may be implemented or performed by any suitable hardware, or combination of hardware and software, including without limitation the system shown and described with respect to FIG. 2, the computing device shown and described with respect to FIG. 6, or a combination thereof. For example, in some embodiments, the operations, functions, or actions illustrated in example process 400, and example process 500 further described below, may be performed, for example, in whole or in part by template generation module 202 and code migration and generation module 204, or any combination of these including other components of system 200 described with respect to FIG. 2.

With reference to process 400 of FIG. 4, and in an illustrative use case, at 402, template generation module 202 can receive source platform code that is to be migrated to a target platform. For example, a user can use admin interaction module 202 to generate a template for use in migrating the source platform code, and admin interaction module 202 can pass or otherwise provide the source platform code to template generation module 202 for processing. In this example, the source platform code may be a customization to an on-prem application (i.e., a source platform) that is being migrated to a cloud-based application (i.e., a target platform).

At 404, template generation module 202 can identify sections of the source platform code that need to be updated to migrate the source platform code to the target platform. For example, the identified sections of code may include code related to API calls to the on-prem application. Note that these API calls need to be converted to API calls supported by the cloud-based application.

At 406, template generation module 202 can determine the properties and/or attributes of the source platform code. The properties and/or attributes of the source platform code can be used to identify one or more existing templates that may be used, for example, as a guide in generating a template for use in migrating the source platform code.

At 408, template generation module 202 can use a learning model to determine one or more existing templates based on the properties and/or attributes of the source platform code. For example, the properties and/or attributes of the customization to the on-prem application can be compared with the metadata associated with individual existing templates to determine a predetermined number of existing templates whose metadata most closely match the properties and/or attributes of the customization.

At 410, template generation module 202 can recommend the one or more existing templates that most closely match the source platform code (e.g., the one or more existing templates whose metadata most closely match the properties and/or attributes of the source platform code) for use in generating a template for the source platform code. For example, template generation module 202 can send the recommendation to admin interaction module 202 for presenting to the user.

At 412, template generation module 202 can generate a template for use in migrating the source platform code to the target platform. For example, the user can use one or more of the recommended existing templates to generate a temple for migrating the customization to the on-prem application to code that implements the customization to the cloud-based application. Note that the user need not use any of the recommended existing templates in generating a template for the source platform code. In any case, the generated template can then be stored for use when migrating the source platform code.

Figure 5:
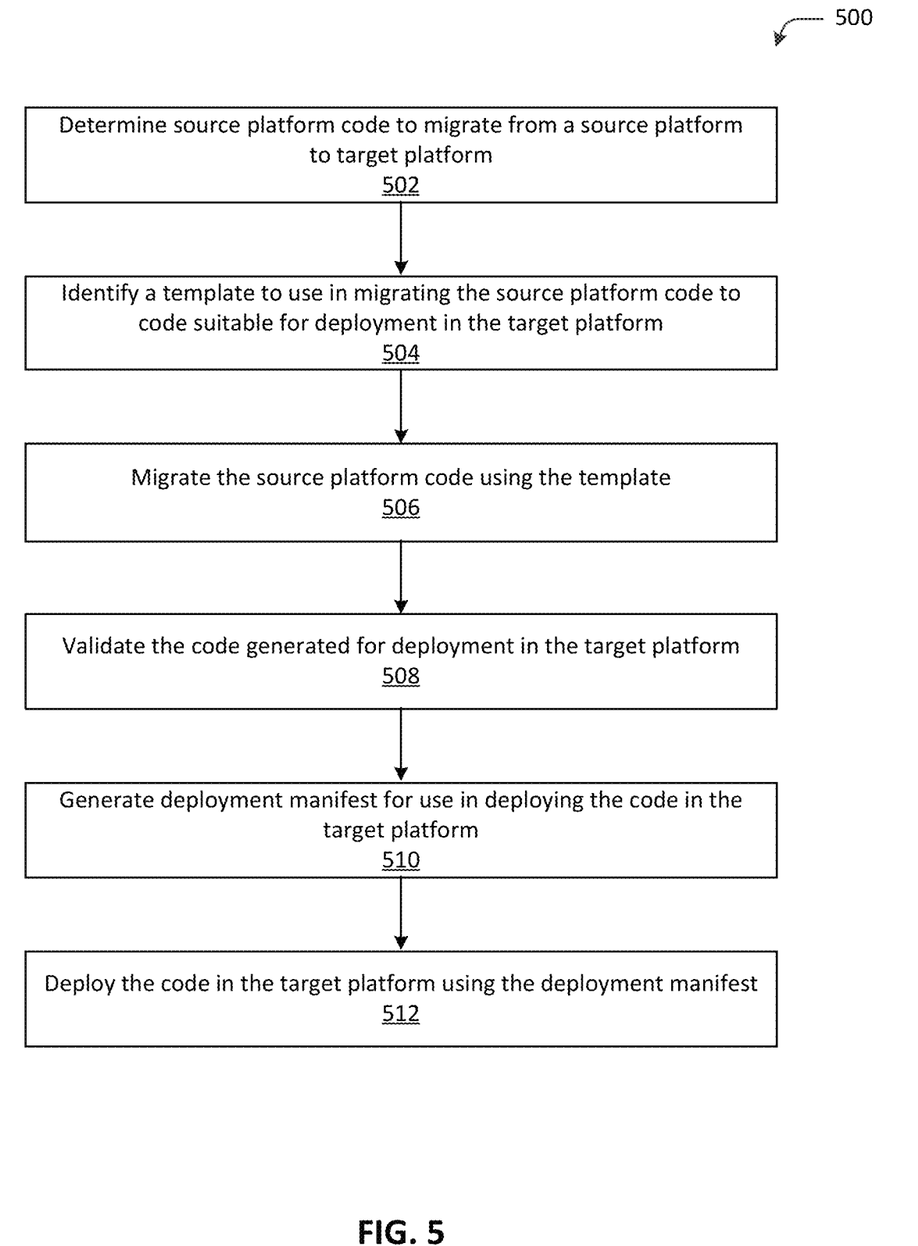
FIG. 5 is a flow diagram of an illustrative process for migrating code from a source platform to a target platform, in accordance with an embodiment of the present disclosure.

FIG. 5 is a flow diagram of an illustrative process 500 for migrating code from a source platform to a target platform, in accordance with an embodiment of the present disclosure. Process 500 is an illustration of code migration frame 100. At 502, source platform code to migrate from a source platform to a target platform can be identified. At 504, a template (e.g., an existing template) to use in migrating the source platform code to code suitable for deployment in the target platform can be identified. At 506, the source platform code can be migrated. For example, sections of the source platform code that need to be updated (e.g., converted) to code that is suitable for the target platform are updated by applying the mappings in the existing template. The result of application of the existing template to the source platform code is the generation of code that is suitable for the target platform.

At 508, the code generated for deployment in the target platform (e.g., the code generated by applying the existing template to the source platform code) can be validated. For example, the code can be validated for compliance with specified standards and recommendations.

At 510, one or more deployment manifests for use in deploying the code in the target platform can be generated. At 512, the code can be deployed in the target platform using a deployment manifest appropriate for the target platform.

Figure 6:
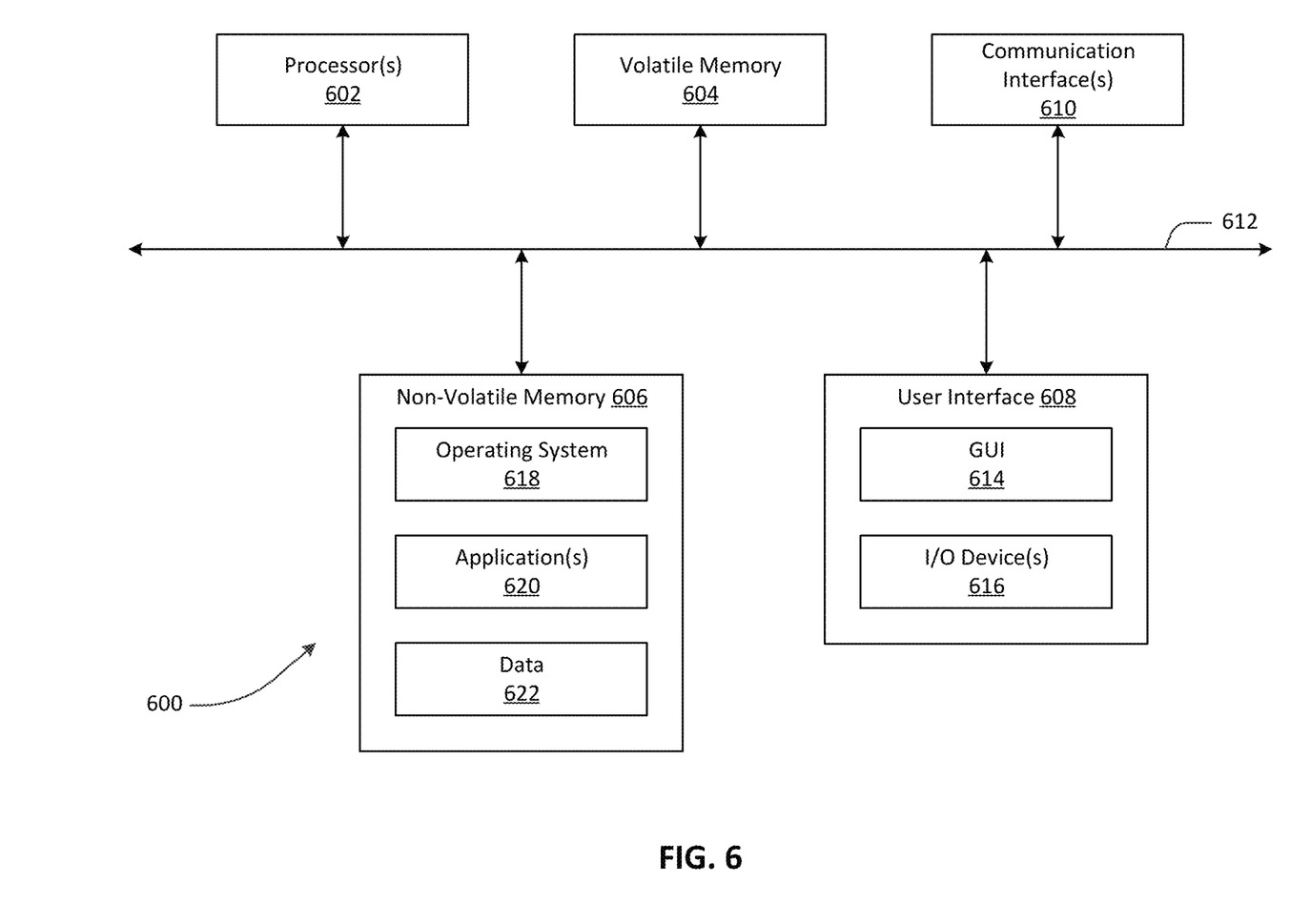
FIG. 6 is a block diagram illustrating selective components of an example computing device in which various aspects of the disclosure may be implemented, in accordance with an embodiment of the present disclosure.

FIG. 6 is a block diagram illustrating selective components of an example computing device 600 in which various aspects of the disclosure may be implemented, in accordance with an embodiment of the present disclosure. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes and/or operations described herein (e.g., processes and/or operations illustrated and described in reference to FIGS. 1 through 5). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative computing machine (e.g., client device or server) and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 602 may be analog, digital or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment"

in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method to recommend an existing template for use in generating a template for code migration, the method comprising:
   determining a source platform code for migration from a source platform to a target platform;
   determining one or more attributes of the source platform code;
   determining, using a machine learning (ML) model, one or more existing templates based on the one or more attributes of the source platform code;
   generating a template for the source platform code based on one of the one or more existing templates;
   migrating, using the template for the source platform code, the source platform code to the target platform code, the migrating including creating one or more stubs to wrap an Application Programming Interface (API) of the target platform and expose functionality of the API to the target platform code; and
   validating the target platform code for compliance with predetermined criteria, wherein the predetermined criteria include one or more of version control (VC) best practices, code quality analysis, security requirements, or performance criteria; and
   responsive to validating the target platform code, generating a deployment manifest configured to deploy the target platform code in the target platform, wherein the generating of the deployment manifest includes processing deployment documents for the source platform code to extract environment variables and dependencies defined for proper running of the source platform code in the source platform.

2. The method of claim 1, wherein the one or more existing templates are determined based on cosine similarity.

3. The method of claim 1, wherein the one or more existing templates are determined based on Euclidean distance.

4. The method of claim 1, wherein the one or more existing templates are determined based on Manhattan distance.

5. The method of claim 1, wherein the source platform is an on-premises computing platform and the target platform is a cloud computing platform.

6. A system comprising: one or more non-transitory machine-readable mediums configured to store instructions; and one or more processors configured to execute the instructions stored on the one or more non-transitory machine-readable mediums, wherein execution of the instructions causes the one or more processors to: determine a source platform code for migration from a source platform to a target platform; determine one or more attributes of the source platform code; determine, using a machine learning (ML) model, one or more existing templates based on the one or more attributes of the source platform code; generate a template for the source platform code based on one of the one or more existing templates; migrate, using the template for the source platform code, the source platform code to the target platform code, the migration including creating one or more stubs to wrap an Application Programming Interface (API) of the target platform and expose functionality of the API to the target platform code; and validate the target platform code for compliance with predetermined criteria, wherein the predetermined criteria include one or more of version control (VC) best practices, code quality analysis, security requirements, or performance criteria; and responsive to validating the target platform code, generate a deployment manifest configured to deploy the target platform code in the target platform, wherein the generating of the deployment manifest includes processing deployment documents for the source platform code to extract environment variables and dependencies defined for proper running of the source platform code in the source platform.

7. The system of claim 6, wherein the one or more existing templates are determined based on one of cosine similarity, Euclidean distance, or Manhattan distance.

8. The system of claim 6, wherein the source platform is an on-premises computing platform.

9. The system of claim 6, wherein the target platform is a cloud computing platform.

10. A non-transitory, computer-readable storage medium has encoded thereon instructions that, when executed by one or more processors, causes a process to be carried out, the process comprising: determining a source platform code for migration from a source platform to a target platform; determining one or more attributes of the source platform code; determining, using a machine learning (ML) model, one or more existing templates based on the one or more attributes of the source platform code; generating a template for the source platform code based on one of the one or more existing templates; migrating, using the template for the source platform code, the source platform code to the target platform code, the migrating including creating one or more stubs to add logging, monitoring, and/or error handling capabilities to the target platform code; and validating the target platform code for compliance with predetermined criteria, wherein the predetermined criteria include one or more of version control (VC) best practices, code quality analysis, security requirements, or performance criteria; and responsive to validating the target platform code, generating a deployment manifest configured to deploy the target platform code in the target platform, wherein the generating of the deployment manifest includes processing deployment documents for the source platform code to extract environment variables and dependencies defined for proper running of the source platform code in the source platform.

11. The method of claim 1, wherein the target platform is a cloud computing platform.

12. The system of claim 6, wherein the one or more existing templates are determined based on cosine similarity.

13. The system of claim 6, wherein the one or more existing templates are determined based on Euclidean distance.

14. The system of claim 6, wherein the one or more existing templates are determined based on Manhattan distance.

15. The non-transitory, computer-readable storage medium of claim 10, wherein the source platform is an on-premises computing platform.

16. The non-transitory, computer-readable storage medium of claim 10, wherein the target platform is a cloud computing platform.

17. The non-transitory, computer-readable storage medium of claim 10, wherein the one or more existing templates are determined based on cosine similarity.

18. The non-transitory, computer-readable storage medium of claim 10, wherein the one or more existing templates are determined based on Euclidean distance.

19. The non-transitory, computer-readable storage medium of claim 10, wherein the one or more existing templates are determined based on Manhattan distance.

* * * * *